United States Patent Office 2,709,648
Patented May 31, 1955

2,709,648

HERBICIDAL COMPOSITION AND METHOD EMPLOYING MIXTURES OF A POLYCHLOROPHENOXY COMPOUND WITH A PHENYL DIMETHYL UREA

Truman C. Ryker, Wilmington, and Dale E. Wolf, Hockessin, Del., assignors to E. I. du Pont de Nemours & Company, Wilmington, Del., a corporation of Delaware No Drawing. Application June 11, 1951,
Serial No. 231,051

2 Claims. (Cl. 71—2.6)

This invention relates to herbicidal compositions and more particularly to compositions containing a mixture of a herbicidal aryl alkyl urea compound with another herbicidally active compound.

Mixtures of herbicidally active compounds have previously been used. Mixtures have been used, for example, in order to kill a wider variety of plant species in a single application than would be killed by either of the component herbicides alone. The combination of 2,4-dichlorophenoxyacetic acid and trichloroacetic acid is such a mixture. The 2,4-dichlorophenoxyacetic acid is selectively more effective in the control of broad-leaved weeds than in the control of grasses, and the trichloroacetic acid is relatively more effective on grasses; thus the mixture is used to control both plant species with the same application.

Other herbicidal compounds have been mixed, for example, to reduce the hazards accompanying the separate application of one of the compounds. A borate-chlorate herbicide mixture is such a composition. The borate acts to reduce the fire hazard inherent in the use of the chlorate.

However to the best of our knowledge, no one has heretofore provided a mixture of herbicidally active compounds in which the compounds are mutually activating to give a greater-than-additive (i. e., synergistic) result in killing or preventing the growth of the same plant species.

It is an object of this invention to provide herbicidal compositions and methods. A further object is to provide herbicidal compositions containing mixtures of herbicidally active compounds which compositions are economically more effective for the control of weeds than are the herbicidal components of the mixture when employed separately in amount sufficient to give the same degree of control. Still other objects will become apparent hereinafter.

The foregoing and other objects of the invention are attained by means of herbicidal compositions which contain, in admixture with another herbicidally active compound, a herbicidal aryl alkyl urea compound represented by the formula:

(1)
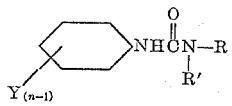

wherein Y is from the group consisting of halogen, nitro, alkyl and alkoxy, the alkyl radical in said alkyl and alkoxy substituents containing 1 to 6 carbon atoms inclusive, $n$ is an integer from 1 to 4 inclusive, R is an alkyl radical containing 1 to 6 carbon atoms inclusive, and R' is a radical from the group consisting of hydrogen and alkyl containing 1 to 6 carbon atoms inclusive; and wherein said herbicidal compounds in said admixture are mutually activating and produce a synergistic herbicidal effect. Preferably R and R' in Formula 1 are alkyl containing 1 to 2 carbon atoms inclusive, and still more preferably, R and R' are identical, that is, they are both methyl or both ethyl. The aromatic radical of Formula 1,

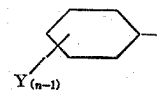

is preferably phenyl, halogenophenyl, methylphenyl, or halogenomethylphenyl.

According to another method, the herbicidal aryl alkyl urea compounds employed in the compositions of the invention can be represented by the formula:

(2)     $N(R)(R')C(O)N(H)Benz(H_{[5-m]})Y_m$ wherein Benz is a benzene nucleus, $m$ is a cardinal number less than 4, and Y, R, and R', have the same significance as indicated in the preceding paragraph.

Illustrative of the aryl alkyl urea herbicidal compounds of Formulae 1 and 2 are:

1-phenyl-3-methylurea
1-p-nitrophenyl-3-methyl-3-ethylurea
1-(3-chloro-4-methoxyphenyl)-3,3-dimethylurea
1-m-hexylphenyl-3,3-diethylurea
1-p-chlorophenyl-3,3-dimethylurea
1-p-bromophenyl-3,3-diethylurea
1-phenyl-3,3-dimethylurea
1-(3-chloro-p-tolyl)-3,3-dimethylurea
1-p-methoxyphenyl-3,3-dimethylurea
1-p-n-butoxyphenyl-3,3-dimethylurea
1-(3,4-dichlorophenyl)-3-methylurea
1-(2,4-dimethylphenyl)-3,3-dimethylurea
1-m-tolyl-3,3-dimethylurea
1-p-chlorophenyl-3-methylurea
1-p-ethylphenyl-3,3-dimethylurea
1-p-tolyl-3-methylurea
1-p-tolyl-3,3-dimethylurea
1-p-sec. butylphenyl-3,3-dimethylurea
1-p-methoxyphenyl-3-methylurea
1-p-chlorophenyl-3-ethylurea
1-phenyl-3,3-dimethylurea
1-p-chlorophenyl-3,3-dimethylurea
1-p-ethoxyphenyl-3,3-dimethylurea
1-m-tolyl-3,3-dimethylurea
1-m-chlorophenyl-3,3-dimethylurea
1-p-chlorophenyl-3-butylurea
1-p-chlorophenyl-3,3-diisopropylurea
1-p-chlorophenyl-3,3-dibutylurea
1-p-chlorophenyl-3-hexylurea
1-p-nitrophenyl-3,3-dimethylurea
1-m-nitrophenyl-3,3-dimethylurea
1-p-bromophenyl-3,3-dimethylurea
1-p-bromophenyl-3-ethylurea
1-m-bromophenyl-3,3-dimethylurea
1-m-fluorophenyl-3,3-dimethylurea
1-p-iodophenyl-3,3-dimethylurea
1-(3,4-dichlorophenyl)-3,3-dimethylurea
1-(3,4-dichlorophenyl)-3,3-diethylurea
1-(3,4-dichlorophenyl)-3,3-dipropylurea
1-(3,4-dichlorophenyl)-3-ethylurea
1-(3,4,5-trichlorophenyl)3,3-dimethylurea
1-(3,4,5-trichlorophenyl)-3,3-diethylurea
1-(3,4,5-trichlorophenyl)-3-methylurea
1-(3,4-xylyl)-3,3-dimethylurea
1-(3,4-xylyl)-3,3-diethylurea
1-(3,4-xylyl)-3-methylurea
1-(3-chloro-p-tolyl)-3,3-dimethylurea
1-(3-chloro-p-tolyl)-3,3-diethylurea
1-(3,5-dichloro-p-tolyl)-3,3-dimethylurea
1-(3,5-dichloro-p-tolyl)-3,3-diethylurea
1-(p-methoxyphenyl)-3,3-dimethylurea
1-(3-chloro-4-methoxyphenyl)-3,3-dimethylurea
1-(3,5-dichloro-4-methoxyphenyl)-3,3-dimethylurea We have found that it is characteristic of the aryl alkyl urea compounds of the class defined by Formulae 1 and 2 and illustrated above to coact with other herbicidally active compounds, both of the hormonal type and contact type herbicidal compounds, to give synergistic herbicidal results.

Illustrative of the hormonal type herbicidal compouds that can be admixed with the aryl alkyl ureas of Formulae 1 and 2 to give compositions of the invention are:

2,4-dichlorophenoxyacetic acid and its salts, esters, and amides
2,4,5-trichlorophenoxyacetic acid and its salts, esters, and amides
2-methyl-4-chlorophenoxyacetic acid and its salts, esters, and amides
Maleic hydrazide and its herbicidal derivatives And contact type of herbicidal compounds that can be admixed with the aryl alkyl ureas of Formulae 1 and 2 to give compositions of the invention are illustrated by the following materials:

Polychlorophenols (3 to 5 chlorine atoms) and their alkaline salts [1]
Sulfamic acid and its salts
Alkaline salts of cyanic acid
Alkaline salts of thiocyanic acid
Mono-, di-, and trichloroacetic acids, their alkaline salts and esters
3,6-endoxohexahydrophthalic acid and its disodium salt
Alkaline salts of arsenous and arsenic acids
Sodium borates
Sodium or calcium cyanamide
Phenyl mercury salts (acetate, oleate, formate, lactate, chloride, phosphate, and the like)
Isopropyl esters of phenyl- and chlorophenylcarbamic acids
1,2,4-trichlorobenzene
Dinitrophenols (dinitro-o-cresol and dinitro-o-sec-butylphenol) and their salts
Boron trifluoride amine complexes ---
[1] The term alkaline salts as used in this tabulation, and elsewhere in the specification and claims, is intended to embrace the sodium, potassium, calcium, and ammonium salts.

The aryl alkyl ureas preferably used in the compositions and methods of the invention are 1-p-chlorophenyl-3,3-dimethylurea, 1-phenyl-3,3-dimethylurea, and 1 - (3,4 - dichlorophenyl) - 3,3 - dimethylurea. Preferably the other herbicidally active compound employed in the compositions and methods of the invention is selected from the group consisting of ammonium sulfamate, alkaline salts of cyanic acid, alkaline salts of thiocyanic acid, dinitrophenols, pentachlorophenates, alkaline salts of trichloroacetic acid, 2,4,5-trichlorophenoxyacetic acid its salts, esters, and amides, and 2,4-dichlorophenoxyacetic acid its salts, esters, and amides.

In operating in accordance with the present invention, any suitable amount of the aryl alkyl urea may be employed in combination with the other herbicidally active compounds to obtain compositions in which the two herbicidal compounds are mutually activating. The relative proportions of the active components will vary depending upon the particular compounds employed, the plant species to be controlled, the physiological age of the plants, the prevailing climatic conditions, etc. It is impossible, therefore, to state exactly the proportions that will be used in all situations; and, indeed, the exact amounts of toxicants in the mixture do not appear to be critical. In general, however, the compositions of the invention will contain from 0.005 to 200 parts by weight of the aryl alkyl urea for each part by weight of the other herbicidally active compound.

The herbicidal mixtures of the invention can be employed by mixing them with conventional pest control adjuvants or modifiers to provide compositions in the form of solutions, dusts, water dispersible powders, and aqueous dispersions or emulsions. Thus they can be employed with a carrier or diluent agent such as a finely divided solid, a solvent liquid of organic origin, water, a wetting agent, a dispersing agent, an emulsifying agent, an aqueous emulsion or any suitable combination of any of these.

Pest control adjuvants or conditioning agents such as the dusts, solvents, wetting agents, dispersing agents, and emulsifying agents set out in United States Patent 2,426,417 can be employed in the preparation of the herbicidal compositions of the present invention. Other wetting, dispersing, and emulsifying agents such as those listed in detail in Bulletin E 607 of the Bureau of Entomology and Plant Quarantine of the U. S. Department of Agriculture and such as those set out in an article by McCutcheon in Chemical Industries, November 1947, page 811 entitled "Synthetic detergents" can also be used.

In the preparation of sprays, the active herbicidal compounds can be separately dispersed in water or other liquid carriers. Alternatively, the herbicidal compounds can be mixed one with the other and the resulting mixture dispersed in the liquid carrier. Also another method of operation includes mixing the herbicidal compounds with finely divided carriers or dusts such as talc, pyrophyllite, natural clays, diatomaceous earth or other powdered diluents such as those set out in the aforementioned U. S. patent and dispersing the resulting mixture in water. Any compatibile wetting or dispersing agent can be employed in the mixture either before or after mixture of the active ingredients with the liquid to obtain spray compositions.

Dust compositions of the invention are obtained by mixing the active herbicidal compounds with finely divided solids such as talc, pyrophyllite, natural clays, diatomaceous earths, and other powdered diluents such as those set out in the aforementioned U. S. patent to give homogeneous free flowing dusts or powders. The amount of the herbicidal compounds included in such dusts will vary with the manner in which the composition is to be applied but in general the dust will contain from 0.1% to 95% by weight of herbicidal compounds.

Liquid compositions of the invention contain the active components either homogeneously dispersed in water or non-solvent carriers, or dissolved in a solvent. To secure homogeneous dispersions, in non-solvent liquid adjuvants, a surface-active agent of the wetting, dispersing, or emulsifying type is used. In fact, the preferred herbicidical compositions of the invention whether in liquid or in solid form contain the herbicidally active compounds homogeneously admixed with such a surface-active agent. Generally, the wetting, dispersing, or emulsifying agent will not comprise more than about 5 to 15% by weight of the composition and with the better surface-active adjuvant materials, the percentage will be 5% or less. Usually, the minimum lower concentration will be 0.1%.

The herbicidal compositions are applied either as a spray or a dust to the locus or area to be protected from weeds. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment of ponds and lake bottoms, it will be convenient to use a pellet form of the compositions.

The active ingredients are, of course, applied in amount sufficient to exert the desired herbicidal action. The amount of herbicidally active compounds present in the compositions as actually applied for destroying or preventing weeds will vary widely with the herbicidal activity of the active ingredients, the purpose for which the application is being made (i. e., whether for short term or long term control), the manner of application, the particular weeds for which control is sought, and like variables. Thus if highly active ingredients are to be used for control of weed infestations that plague food crops, the compositions containing the active ingredients are normally further diluted with a liquid to form a spray composition or with a powdered solid to give a dust containing relatively low concentration of the active compounds. On the other hand, if used to sterilize soil as in the treatment of power line or railroad right of ways, one or more of the active ingredients may, if of relatively low order of activity, be used in high concentration. In general, the herbicidal compositions as applied in the form of a spray or a dust will contain from about 0.02% to 95% by weight of the combined herbicidally active compounds.

Compositions and methods of the invention are illustrated by the following examples. The numbers following the tabulated ingredients represent parts by weight of the ingredients in the respective compositions.

EXAMPLE I

*Water dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---|
| 1-p-chlorophenyl-3-methylurea | 50 |
| Ammonium cyanate | 25 |
| Sodium lauryl sulfate (wetting agent) | 1 |
| Goulac (dispersing agent) | 3 |
| Fuller's earth | 21 |
| | 100 |

B

| | |
|---|---|
| 1-p-chlorophenyl-3,3-dimethylurea | 45 |
| Dinitro-o-sec-butyl phenol | 30 |
| Alkylated aryl polyether alcohol (wetting and dispersing agent) | 4 |
| Fuller's earth | 21 |
| | 100 |

C

| | |
|---|---|
| 1-phenyl-3,3-dimethylurea | 80 |
| 2,4-dichlorophenoxyacetic acid, sodium salt | 10 |
| Alkylnaphthalene sodium sulfate (wetting and dispersing agent) | 2 |
| Fuller's earth | 8 |
| | 100 |

D

| | |
|---|---|
| 1-(3,4-dichlorophenyl)-3,3-dimethylurea | 10 |
| Ammonium sulfamate | 80 |
| Aryl alkyl sodium sulfonate (wetting agent) | 2 |
| Goulac (dispersing agent) | 3 |
| Bentonite | 5 |
| | 100 |

E

| | |
|---|---|
| 1-phenyl-3,3-diethylurea | 45 |
| Trichloroacetic acid, sodium salt | 45 |
| Sodium disulfonate of dibutyl phenylphenol (wetting and dispersing agent) | 2 |
| Fuller's earth | 8 |
| | 100 |

EXAMPLE II

*Oil-water dispersible powders*

The following powdered compositions are adapted for use in the preparation of spray compositions using either an oil, water, or a combination of oil and water as the liquid diluent. The powders are made by mixing and grinding as in the case of the powders of Example I.

A

| | |
|---|---|
| 1-p-chlorophenyl-3-methylurea | 60 |
| Sodium pentachlorophenate | 30 |
| Alkylated aryl polyether alcohol (wetting and dispersing agent) | 4 |
| Fuller's earth | 6 |
| | 100 |

B

| | |
|---|---|
| 1-m-fluorophenyl-3,3-diethylurea | 80 |
| 2,4,5-trichlorophenoxyacetic acid, triisopropanolamine salt | 6 |
| Ethylene oxide stearate-laurate (emulsifying agent) | 4 |
| Pyrophyllite | 10 |
| | 100 |

EXAMPLE III

*Water-dispersible liquid compositions*

The following compositions are in a liquid form and are adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compounds and conditioning agent or agents in an organic liquid diluent.

A

| | |
|---|---|
| 1-p-chlorophenyl-3,3-dimethylurea | 20 |
| Ammonium thiocyanate | 30 |
| Alkylated aryl polyether alcohol (wetting and emulsifying agent) | 3 |
| Methyl cellulose (dispersing agent) | 1 |
| Kerosene | 46 |
| | 100 |

B

| | |
|---|---|
| 1-p-chlorophenyl-3,3-dibutylurea | 20 |
| Sodium trichloroacetate | 25 |
| Long chain fatty alcohol sulfate (emulsifying agent) | 2 |
| Goulac (dispersing agent) | 3 |
| Refined kerosene | 50 |
| | 100 |

C

| | |
|---|---|
| 1-phenyl-3-methylurea | 22 |
| Dinitro-o-sec-butyl phenol | 22 |
| Polyoxyethylene sorbitan monolaurate (emulsifying agent) | 3 |
| Kerosene | 53 |
| | 100 |

D

| | |
|---|---|
| 1-p-chlorophenyl-3,3-diethylurea | 25 |
| Potassium cyanate | 20 |
| Alkylated aryl polyether alcohol (wetting and emulsifying agent) | 4 |
| Xylol | 51 |
| | 100 |

EXAMPLE IV

Dust formulations

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---|
| 1-p-chlorophenyl-3,3-dimethylurea | 4 |
| 2,4-dichlorophenoxy acetamide | 4 |
| Hydrocarbon oil | 4 |
| Talc | 88 |
| | 100 |

B

| | |
|---|---|
| 1-m-tolyl-3,3-dihexylurea | 3 |
| Phenyl mercury acetate | 1 |
| Hydrocarbon oil | 2 |
| Walnut shell flour | 94 |
| | 100 |

C

| | |
|---|---|
| 1-phenyl-3,3-dimethylurea | 2 |
| Ammonium thiocyanate | 4 |
| Cottonseed oil | 4 |
| Cottonseed flour | 90 |
| | 100 |

EXAMPLE V

Granular compositions

The following compositions are adapted for application by a means of a fertilizer spreader apparatus or similar equipment. The compositions are readily prepared by mixing the ingredients with water to form a paste. The paste is then extruded, dried, and ground to give the desired granular size. Preferably, the granules will be in the order of one-thirty second to one-quarter inch diameter.

A

| | |
|---|---|
| 1-p-chlorophenyl-3,3-dimethylurea | 5 |
| Sodium trichloroacetate | 10 |
| Goulac (dispersing agent) | 3 |
| Hydrocarbon oil | 1 |
| Dextrin (binding agent) | 20 |
| Fuller's earth | 61 |
| | 100 |

B

| | |
|---|---|
| 1-p-chlorophenyl-3,3-diethylurea | 5 |
| Isopropyl-N-(3-chlorophenyl) carbamate | 3 |
| Goulac | 3 |
| Refined kerosene | 1 |
| Gelatin | 25 |
| Talc | 63 |
| | 100 |

The utility of the compositions of the invention is illustrated by the following tabulated data which show the herbicidal results obtained in tests in which compositions of the invention are compared with compositions containing one or the other rather than a mixture of the herbicidal compounds.

In order that the results obtained permit a valid comparison, the comparative tests within each experiment shown in the table were made under identical conditions and with plants as nearly identical as possible. This was done by conducting comparative tests simultaneously at the same location on plants selected for genetic purity, size, and color (where color is indicative of nutritional conditions) from a group of plants grown in the same lot. It is essential that comparative tests be made under such carefully controlled conditions because of the widely differing effects that a given concentration or quantity of a herbicidal composition will produce on a given plant species depending upon the stage of plant development, nutritional status, soil moisture, and climatic conditions such as relative humidity, temperature, light intensity, and light duration.

In carrying out the tests, an aqueous dispersion of a formulation of the active compound or compounds being tested was made. The aqueous dispersion contained the concentration of active material shown in the table. The aqueous dispersions were sprayed on to the test plants in as nearly identical amounts as possible within each series of comparative tests; thus, for example, if one gallon of aqueous dispersion were applied in the test of Example 6a, then one gallon of aqueous dispersion was also applied in test 6b, and in test 6c.

In the tests recorded in Examples 6 thru 12, Johnson grass seedlings was the test plant used; in Example 13, the test plant was quack grass. The urea compound used was 1-p-chlorophenyl-3,3-dimethylurea. In tests recorded as part a of Examples 8, 9, 11, and 12, the tests were terminated short of the time required under the conditions of the tests to obtain kill with the urea compound alone. This was done because the results available at the time of such termination had demonstrated the mutually activating properties of the mixture of the urea compound with the other herbicidal compound and it was therefore unnecessary to continue tests on the separate urea compound.

TABLE

| Test No. | Active Compound | | Results |
|---|---|---|---|
| | Name | Percent by weight | |
| Example 6: | | | |
| a | Urea compound | 0.5 | Required 25 days to kill the grass. |
| b | ammonium sulfamate | 2.0 | Slight leaf burn only after 45 days. |
| c | Urea compound | 0.375 | Grass killed within 14 days. |
| | ammonium sulfamate | 0.5 | |
| Example 7: | | | |
| a | Urea compound | 1.0 | Required 23 days to kill the grass. |
| b | Sodium pentachlorophenate | 1.0 | Grass not dead at end of 45 days. Slight leaf burn. |
| c | Urea compound | 0.25 | Grass killed within 9 days. |
| | Sodium pentachlorophenate | 0.5 | |
| c' | Urea compound | 0.125 | Do. |
| | Sodium pentachlorophenate | 0.75 | |
| c'' | Urea compound | 0.375 | Do. |
| | Sodium pentachlorophenate | 0.25 | |
| Example 8: | | | |
| a | Urea compound | 0.5 | Grass not dead at end of 4 weeks. |
| b | Sodium 2,4-dichlorophenoxyacetate | 1.0 | Do. |
| c | Urea compound | 0.375 | Grass dead in 4 weeks. |
| | Sodium 2,4-dichlorophenoxyacetate | 0.25 | |
| Example 9: | | | |
| a | Urea compound | 0.5 | Grass not dead at end of 4 weeks. |
| b | Sodium pentachlorophenate | 1.0 | Do. |
| c | Urea compound | 0.25 | Grass dead at end of 4 weeks. |
| | Sodium pentachlorophenate | 0.5 | |

Table—Continued

| Test No. | Active Compound | | Results |
|---|---|---|---|
| | Name | Percent by weight | |
| Example 10: | | | |
| a | Urea compound | 0.75 | Required 23 days to kill. |
| b | potassium cyanate | 1.0 | Not dead at end of 45 days. Slight leaf burn. |
| c | Urea compound | 0.25 | Dead within 13 days. |
| | potassium cyanate | 0.5 | |
| Example 11: | | | |
| a | Urea compound | 0.5 | Not killed within 28 days. |
| b | ammonium thiocyanate | 1.0 | Not killed. Only slight leaf burn. |
| c | Urea compound | 0.25 | Killed within 28 days. |
| | ammonium thiocyanate | 0.5 | |
| c' | Urea compound | 0.375 | Do. |
| | ammonium thiocyanate | 0.25 | |
| Example 12: | | | |
| a | Urea compound | 0.5 | Not killed within 28 days. |
| b | sodium trichloroacetate | 2.0 | Do. |
| c | Urea compound | 0.375 | Killed within 28 days. |
| | Sodium trichloroacetate | 0.5 | |
| Example 13: | | | |
| a | Urea compound | 0.625 | Not dead at end of 27 days, but dead on 37th day. |
| b | dinitro-o-sec-butyl phenol | 1.0 | Failed to kill. |
| c | Urea compound | 0.375 | Dead within 21 days. |
| | dinitro-o-sec-butyl phenol | 0.25 | |

Still further examples of combinations in which substituted ureas and other herbicidal compounds are mutually activating to produce a synergistic herbicidal effect are:

1-(3,4-dichlorophenyl)-3,3-dimethylurea and ammonium sulfamate 1-(3,4-dichlorophenyl)-3,3-dimethylurea and sodium pentachlorophenate 1-(3,4-dichlorophenyl)-3,3-dimethylurea and ammonium thiocyanate 1-phenyl-3,3-dimethylurea and disodium 3,6-endoxo-hexahydrophthalate 1-phenyl-3,3-dimethylurea and potassium cyanate 1-phenyl-3,3-dimethylurea and sodium 2,4-dichlorophenoxyacetate 1-phenyl-3,3-dimethylurea and sodium 2,4,5-trichlorophenoxyacetate 1-p-tolyl-3,3-dimethylurea and sodium trichloroacetate 1-p-tolyl-3,3-dimethylurea and sodium pentachlorophenate 1-p-tolyl-3,3-dimethylurea and ammonium sulfamate 1-p-chlorophenyl-3-methylurea and dinitro-o-sec-butyl phenol 1-p-chlorophenyl-3-methylurea and ammonium thiocyanate 1-p-chlorophenyl-3-methylurea and sodium 2,4-dichlorophenoxyacetate 1-p-chlorophenyl-3,3-dibutylurea and phenyl mercury acetate 1-p-chlorophenyl-3-n-butylurea and sodium pentachlorophenate 1-(3,4-dichlorophenyl)-3,3-dimethylurea and calcium cyanamide 1-(3-chloro-p-tolyl)-3,3-dimethylurea and dinitro-o-sec-butylphenol 1-p-chlorophenyl-3,3-diethyl and ammonium sulfamate 1-p-sec-butylphenyl-3-methylurea and sodium 2,4,5-trichlorophenoxyacetate 1-m-bromophenyl-3,3-dimethylurea and sodium trichloroacetate 1-p-nitrophenyl-3,3-dimethylurea and dinitro-o-cresol 1-(p-chlorophenyl)-3,3-dimethylurea and closely related 1-(halogenoaryl)-3,3-dialiphatic hydrocarbon ureas, and 1-(3,4-dichlorophenyl)-3,3-dimethylurea and closely related 1-(m-chlorophenyl)-3,3-dialiphatic hydrocarbon ureas are claimed in coassigned copending application Serial No. 271,632, now U. S. Patent 2,655,445, filed February 14, 1952, as a continuation in part of, inter alia, co-assigned copending applications of Charles W. Todd, Serial No. 131,498, filed December 6, 1949, and Serial No. 231,061, filed June 11, 1951, both now abandoned. 1-(p-methoxyphenyl)-3,3-dimethylurea and closely related 1-(alkoxyaryl)-3,3-dialiphatic hydrocarbon ureas are claimed in a co-assigned copending application of Harold E. Cupery, Norman E. Searle, and Charles W. Todd, Serial No. 228,992, filed May 29, 1951, now abandoned. Herbicidal compositions and methods employing 3-phenyl-1,1-dimethylurea and related 1-aromatic-3-aliphatic hydrocarbon ureas as essential active ingredients are claimed in coassigned copending application Serial No. 271,634, now U. S. Patent 2,655,447, filed February 14, 1952, as a continuation in part of, inter alia, co-assigned copending applications of Harold E. Cupery, Norman E. Searle, and Charles W. Todd, Serial No. 186,118, filed September 21, 1950, and Serial No. 231,062, filed June 11, 1951, both now abandoned.

We claim:

1. A herbicidal composition containing, in admixture with a herbicidally active polychlorophenoxy compound selected from the group consisting of pentachlorophenates, 2,4,5-trichlorophenoxyacetic acid, its salts, esters and amides, and 2,4-dichlorophenoxyacetic acid, its salts, esters and amides, a herbicidally active phenyl dimethyl urea compound selected from the group consisting of 1-p-chlorophenyl-3,3-dimethylurea, 1-phenyl-3,3-dimethylurea, and 1-(3,4-dichlorophenyl)-3,3-dimethylurea, said herbicidal composition containing said admixture of said herbicidal compounds in a herbicidal concentration; and wherein said herbicidal compounds in said admixture are mutually activating and produce a synergistic herbicidal effect.

2. A method for the destruction and prevention of weeds which comprises applying to a locus to be protected, in amount sufficient to exert the desired destruction and prevention of weeds, a herbicidal composition containing, in admixture with a herbicidally active polychlorophenoxy compound selected from the group consisting of pentachlorophenates, 2,4,5-trichlorophenoxyacetic acid, its salts, esters and amides, and 2,4-dichlorophenoxyacetic acid, its salts, esters and amides, a herbicidally active phenyldimethyl urea compound selected from the group consisting of 1-p-chlorophenyl-3,3-dimethylurea, 1-phenyl-3,3-dimethylurea and 1-(3,4-dichlorophenyl)-3,3-dimethylurea; and wherein said herbicidal compounds in said admixture are mutually activating and produce a synergistic herbicidal effect.

References Cited in the file of this patent

UNITED STATES PATENTS

| | | |
|---|---|---|
| 2,303,192 | Billman | Nov. 24, 1942 |
| 2,326,471 | Lontz | Aug. 10, 1943 |
| 2,412,510 | Jones | Dec. 10, 1946 |
| 2,453,983 | Sexton | Nov. 16, 1948 |

OTHER REFERENCES

Agricultural Chemicals, February 1951, page 37.